United States Patent
Wheeler et al.

[19]

[11] Patent Number: 6,127,056
[45] Date of Patent: Oct. 3, 2000

[54] START UP OF PROTON EXCHANGE MEMBRANE FUEL CELL

[75] Inventors: Douglas J. Wheeler, Tolland; Leonard J. Bonville, Marlborough, both of Conn.

[73] Assignee: International Fuel Cells, LLC, South Windsor, Conn.

[21] Appl. No.: 09/169,405

[22] Filed: Oct. 9, 1998

[51] Int. Cl.[7] ................................................. H01M 8/04
[52] U.S. Cl. .............................................. 429/13; 429/26
[58] Field of Search ................................. 429/13, 26, 32, 429/38

[56] References Cited

U.S. PATENT DOCUMENTS

| | | | |
|---|---|---|---|
| 4,537,839 | 8/1985 | Cameron | 429/20 |
| 4,769,297 | 9/1988 | Reiser et al. | 429/17 |
| 5,330,858 | 7/1994 | Shundou et al. | 429/32 X |
| 5,503,944 | 4/1996 | Meyer et al. | 429/13 |
| 5,712,052 | 1/1998 | Kawatsu | 429/13 |
| 5,753,383 | 5/1998 | Cargnelli et al. | 429/26 X |
| 5,998,053 | 12/1999 | Dietheum | 429/13 X |

*Primary Examiner*—Stephen Kalafut
*Attorney, Agent, or Firm*—M. P. Williams

[57] ABSTRACT

A proton exchange membrane fuel cell has a noble metal or noble metal alloy catalyst 15 disposed in its air inlet manifold 13. During start up, a fuel cell is warmed to operating temperature by introducing a small amount of hydrogen into a flow of air to the air inlet 12 of the fuel cell where they react with the catalyst to produce heat at subflame temperatures. The adiabatic temperature rise of the gas stream is limited to about 150° F. by limiting the hydrogen to about one volume percent of the fuel/oxidant mixture, thereby to be capable of raising the fuel cell temperature, for instance, from −40° C. (−40° F.) to about +45° C. (+113° F.), without flame, explosion or drying out of the membrane.

7 Claims, 1 Drawing Sheet

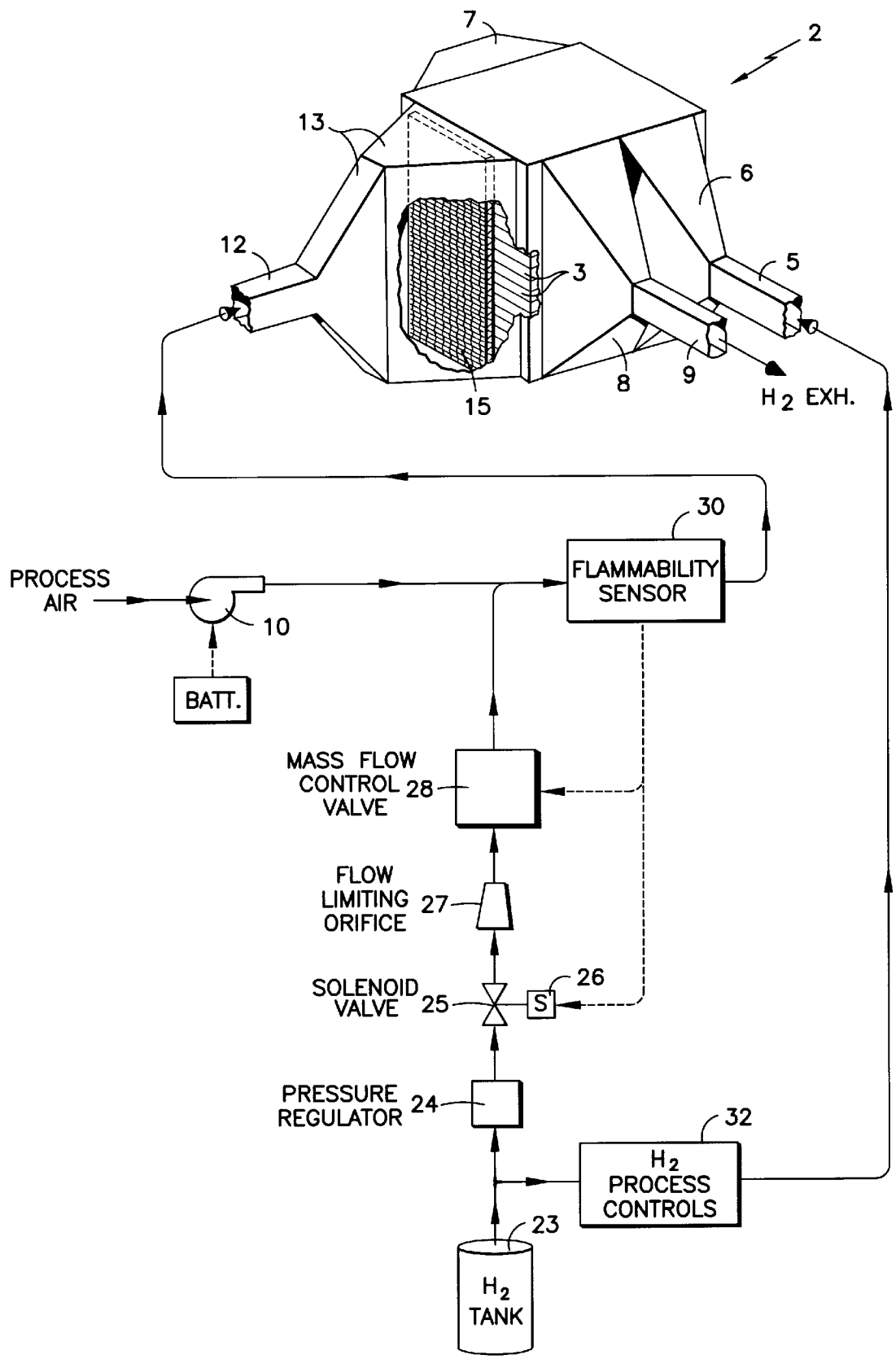

START UP OF PROTON EXCHANGE MEMBRANE FUEL CELL

TECHNICAL FIELD

This invention relates to start up of a proton exchange membrane (PEM) fuel cell by the introduction of an oxidant with a small amount of fuel, such as hydrogen, into the normal process oxidant (air) channel on the cathode side, the oxygen and fuel reacting on a catalyst in the air inlet manifold to produce heat thereby to warm the fuel cell to a temperature at which normal fuel cell operation may begin.

BACKGROUND ART

Several different types of fuel cells are common in the art. In one type, such as phosphoric acid fuel cells and potassium hydroxide fuel cells, the electrolyte is liquid. In a PEM fuel cell, a thin film, electrode consists of a catalyst and a proton exchange membrane, or it may use a more conventional gas diffusion electrode having a catalyst, a proton exchange membrane and a hydrophobic polymer, such as TEFLON®. Because of its solid electrolyte, the PEM fuel cell has inherent pressure and safety advantages over cells that utilize liquid acid or alkaline electrolytes, for use in some environments, such as in electrically powered vehicles. Solid electrolyte is stable, can withstand greater pressure differentials, and does not leach from the cell. However, water management is required to keep the anode and the proton exchange membrane wet, and to prevent the cathode from flooding, and thereby blocking the oxidant from reaching the cathode. Examples are shown in U.S. Pat. Nos. 4,769,297 and 5,503,944.

When any fuel cell is utilized in an isolated environment, it may be subject to extreme winter temperatures, including temperatures well below 0° C. (+32° F.). In fact, it may be as low as −40° C. (−40° F.) whereas the fuel cell may not operate below about 0° C. (+32° F.). And the water remaining from prior operation may form solid ice, thus preventing reactants from reaching the electrodes. In U.S. Pat. No. 5,798,186, minimal operation of a PEM fuel cell at −10° C. (−24° F.) with an electric heater as a load, warms the fuel cell to above-freezing temperature.

A fuel cell which is to be used to power an electric vehicle must of necessity be as simple, small and light weight as possible. That means that any accessories utilized to pre-heat the fuel cell, which is certainly required in all sub-freezing climates, must also be extremely light and compact.

DISCLOSURE OF INVENTION

Objects of the invention include starting a PEM fuel cell, the temperature of which is below normal operating temperature, starting a PEM fuel cell in which water is frozen, provision of light weight, compact preheat for a vehicle fuel cell, and starting a cold PEM fuel cell without use of external heating means.

According to the present invention, a catalyst is provided within the oxidant inlet manifold of a PEM fuel cell, and a small amount of fuel is introduced into the process oxidant flow into the manifold on start-up of the fuel cell, the mixture reacting on the catalyst to consume most of the fuel and form heat, thereby heating the oxidant flow which raises the temperature of the fuel cell. In one embodiment, a dilute mixture of hydrogen, on the order of one volume percent hydrogen in air, is flowed into the air inlet manifold of a PEM fuel cell having a catalyst fitted in the manifold, so as to raise the gas stream temperature by about 85° C. (150° F.), so that in about five or ten minutes time, the temperature of the fuel cell may be raised from, for instance, −40° C. (−40° F.) to +45° C. (+113° F.).

According to the invention, the amount of hydrogen in the oxidant stream must be limited to less than four volume percent of the mixture in order to cause the reaction to remain below flammability and explosion limits, as well as to keep the localized temperature below about 90° C. (194° F.) to prevent damage to the fuel cell proper.

The dilute mixture of fuel and oxidant may be pumped into the fuel cell by means of a battery operated pump, or by means of a manually operated pump, as suits the requirements of any utilization of the invention. The source of fuel may comprise pressurized fuel stored in a tank specifically for the purpose, or it may be provided by hydrogen stored from operation of a related fuel processing system, during operation of the fuel cell.

Other objects, features and advantages of the present invention will become more apparent in the light of the following detailed description of exemplary embodiments thereof, as illustrated in the accompanying drawing.

BRIEF DESCRIPTION OF THE DRAWINGS

The sole FIGURE herein is a partial, partially broken away perspective view of a fuel cell stack employing the invention, including a schematic diagram of a portion of a fuel cell system utilizing the present invention.

BEST MODE FOR CARRYING OUT THE INVENTION

Referring to FIG. 1, a fuel cell stack 2 employing the present invention includes a plurality of PEM fuel cells 3 arranged in a stack in a conventional manner. The stack has a fuel inlet duct 5 and a fuel inlet manifold 6, a fuel turnaround manifold 7, a fuel exit manifold 8, and a fuel exit duct 9. The stack 2 also has an air (oxidant) inlet duct 12 and an air inlet manifold 13. A supported catalyst structure 15 is mounted within the air inlet manifold 13. The catalyst typically may comprise a noble metal or an alloy of noble metals as conventionally used within fuel cells. The catalyst may be supported on alumina, some other ceramic, metal, or even carbon. Alternatively, the catalyst may be any transition metal element that catalyses the reaction of oxygen and hydrogen, such as nickel or cobalt. The support can be in the shape of spheres forming a loose packed bed or in the shape of a reticulated foam. The support is designed so as not to create a large pressure drop in the air flowing into the fuel cell during normal fuel cell operation. Alternatively, the supported catalyst structure 1 5 may consist of a woven or non-woven ceramic cloth such as a cloth consisting of one made from carbon, fiberglass or zirconia fibers. Deposited onto the flexible support is a supported catalyst consisting of a noble metal or noble metal alloy. The noble metal catalysts are supported on well-known high surface area supports such as alumina, carbon or zeolites. The quantity of catalysts and the properties of the cloth and the number of plys of the cloth are selected such that most of the hydrogen is reacted prior to entering the cell and so as not to create a large pressure drop.

In accordance with the invention, fuel, such as hydrogen from a tank 23 is passed through a pressure regulator 24, a shutoff valve 25 which may be operated by a solenoid 26, a flow limiting orifice 27 and a mass flow control valve 28 to mix with air from the pump 10 to provide a dilute fuel/air mixture to the cathode side of the fuel cell stack 2 through the duct 12 and manifold 13. A flammability sensor 30 may be a B-Ultima-31-B-Y-D-O-041-1-T made by MSA of Pittsburgh, Pa. It provides a signal that is used to adjust the mass control valve so as to ensure that the hydrogen does not exceed about 4 volume percent of the air fuel mixture entering the cathode. In addition, should the flammability sensor sense the presence of a sufficient amount of hydrogen so that flame or explosion is likely, it can cause the solenoid 26 to close the shutoff valve 25. In a typical utilization of the invention, a vehicle on-board computer will program the solenoid 26 to open the valve 25 when the vehicle is to be started, will monitor the flammability of the air/fuel mixture and will control the mass flow control valve so that the fuel air mixture will remain sufficiently dilute to avoid flames, explosions and overheating (drying out) of the cathode. According to the invention, the massflow control valve is operated to provide on the order of 1% fuel by volume in the fuel air mixture. This results in an adiabatic temperature rise of the gas stream of on the order of +85° C. (+150° F.) which is sufficiently low as to not damage the fuel cell but high enough to heat the fuel cell to above 0° C. (+32° F.) in five to ten minutes.

The flow of process fuel, such as hydrogen, is controlled in a conventional way by process controls 32.

Of course, it is understood that care must be taken to avoid localized heating, and possible damage to the fuel cell components. Furthermore, once a temperature is reached at which the fuel cell can operate, the fuel cell can be further warmed by introducing the normal reactants and causing current to flow through a controlled, resistive load, thereby to warm the fuel cell still further, to normal operating temperature.

The aforementioned patents are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. In a fuel cell having a proton exchange membrane electrolyte and process oxidant channel, fed through an oxidant inlet manifold, in which oxidant is transported to the cathode side of the fuel cell, a method of warming the fuel cell during start up of operation, comprising:

supporting a metal or metal alloy catalyst in said manifold; and providing a dilute mixture of hydrogen and oxidant to said oxidant inlet manifold at start up, said mixture having a volume percent of hydrogen less than 4%.

2. A method according to claim 1 further comprising:

monitoring the concentration of hydrogen in the mixture and adjusting the concentration to provide an adiabatic temperature rise of the gas stream about +85° C. (+150° F.).

3. A method according to claim 1 wherein said mixture is monitored and controlled to maintain about 1% hydrogen by volume.

4. A method according to claim 1 wherein said supporting step comprises:

supporting a noble metal or noble metal alloy catalyst in said manifold.

5. A fuel cell comprising:

a proton exchange membrane electrolyte;

a process oxidant channel for delivery of process oxygen to the cathode side of said fuel cell, said channel including an oxidant inlet manifold;

a supported metal or metal alloy catalyst disposed in said oxidant inlet manifold;

a source of hydrogen;

a source of oxygen;

means operative upon start up of said fuel cell to flow a stream of oxidant from said source of oxidant to said process oxidant channel; and means operative upon start up of said fuel cell to introduce hydrogen from said source of hydrogen into said oxidant stream, thereby to provide a dilute hydrogen/oxidant mixture, having less than four volume percent of hydrogen, to said supported catalyst, whereby the reaction thereof on said supported catalyst will warm said gas and in turn warm said fuel cell.

6. Apparatus according to claim 5 further comprising means for adjusting the concentration of hydrogen in said dilute hydrogen/oxidant mixture to about one volume percent of the hydrogen/oxidant mixture so as to provide an adiabatic temperature rise of the gas stream of about +85° C. (+150° F.).

7. Apparatus according to claim 5 wherein said catalyst is a noble metal or a noble metal alloy.

* * * * *